United States Patent [19]

Robinson

[11] Patent Number: 4,659,352

[45] Date of Patent: Apr. 21, 1987

[54] REACTIVE ATMOSPHERE PROCESSING OF HEAVY-METAL FLUORIDE GLASSES

[75] Inventor: Morton Robinson, Agoura, Calif.

[73] Assignee: Hughes Aircraft Company, Los Angeles, Calif.

[21] Appl. No.: 747,472

[22] Filed: Jun. 21, 1985

[51] Int. Cl.$^4$ ................................................ C03C 3/12
[52] U.S. Cl. .......................................... 65/2; 65/30.1; 65/134; 65/DIG. 16; 501/37; 501/40; 501/904
[58] Field of Search ................... 65/DIG. 16, 134, 2, 65/30.1; 501/37, 40, 904

[56] References Cited

U.S. PATENT DOCUMENTS

| | | | |
|---|---|---|---|
| 4,065,280 | 12/1977 | Kao et al. | 65/DIG. 16 |
| 4,141,741 | 2/1979 | Lucas et al. | 501/40 |
| 4,162,908 | 7/1979 | Rau et al. | 65/DIG. 16 |
| 4,341,873 | 7/1982 | Robinson et al. | 65/30.1 |
| 4,343,638 | 8/1982 | Mitachi et al. | 65/2 |
| 4,539,032 | 9/1985 | Tran et al. | 65/134 |

FOREIGN PATENT DOCUMENTS 0144437 11/1980 Japan .

*Primary Examiner*—Arthur Kellogg
*Attorney, Agent, or Firm*—Victor G. Laslo; A. W. Karambelas

[57] ABSTRACT

Process for treating molten mixtures of fluorozirconate glass to form high purity infrared transparent glass which is essentially free of zirconium fluoride disassociation impurities and anion impurities. The molten mixture or melt is treated with a moisture-free oxygen reactive atmosphere to prevent formation of disassociation impurities or to remove any of these impurities already present in the melt. The melt is also contacted simultaneously or subsequently with a fluorine species reactive gas to remove any oxygen anion impurities formed during the oxygen reactive atmosphere treatment of the melt to thereby provide a glass having complete fluorine stoichiometry and which is free of disassociation and anion impurities.

13 Claims, No Drawings

REACTIVE ATMOSPHERE PROCESSING OF HEAVY-METAL FLUORIDE GLASSES

TECHNICAL FIELD

The present invention relates generally to the preparation and purification of fluorozirconate glasses utilizing reactive atmospheres. More particularly, the present invention relates to the treating of molten mixtures of fluorozirconate glasses with reactive atmospheres containing oxygen and fluorine to form melts which are essentially free of anion impurities and impurities due to reduction or disassociation of $ZrF_4$.

BACKGROUND OF THE INVENTION

Fluorozirconate and fluorohafnate glasses are unique nonoxide materials which include zirconium tetrafluoride ($ZrF_4$) or hafnium tetrafluoride ($HfF_4$), respectively, as major constituents. These multicomponent glasses are commonly referred to as the heavy-metal fluoride glasses.

The heavy-metal fluoride glasses have been found to have certain desirable physical characteristics which make them ideally suited for a wide variety of applications in optical systems. Heavy-metal fluoride glasses are prime candidates for use as optical fibers for communications or transmission of optical power. A survey of the development of heavy-metal fluoride glasses, their properties and their uses is set forth by Martin G. Drexhage in Chapter 4 of the *Treatise on Materials Science and Technology*, Vol. 26 (1985), pages 151–243. The contents of this chapter are hereby incorporated by reference.

The heavy metal fluoride glasses based on the zirconium tetrafluoride-barium difluoride ($BaF_2$) - X system ($ZrF_4$-$BaF_2$-X), where X is thorium tetrafluoride ($ThF_4$) or one of several rare earth tri-fluorides such as $LaF_3$ or $GdF_3$, have been intensely studied due to desirable optical and physical properties. This new class of material was reported first by N. M. Chanthanasinh in his doctoral thesis for the University of Rennes (France) in July of 1976 and later by Poulain et al in the *Materials Research Bulletin* 12, 151 (1977). The vitreous domain for $ZrF_4$ - $BaF_2$ - $ThF_4$ was described as an area of a triangle on the ternary diagram bounded by the following maxima: 63 mole percent $ZrF_4$; 38 mole percent $BaF_2$ and 15 mole percent $ThF_4$.

The preparation technique typically used by these earlier workers consisted of reacting highly purified components at 800° to 900° C. in an argon or other inert gas atmosphere. The starting materials used in the above system were contained in a platinum crucible and the glass produced by the system was formed by pouring the fully reacted melt into a mold residing in a nitrogen filled glove box.

A problem experienced with the above basic preparation technique and other processes involving the use of inert atmospheres is that internal bulk defects were manifested as a black-opaque secondary phase. Initially, the defects were thought to be due to reduced trace impurities present in the raw materials and thought to require exposure of the melts to air during processing. (Poulain, M. and Lucas, J. (1978); Verres, Refract, 32, 505). However, the use of air as the melt processing atmosphere has been inadvisable due to the formation of hydroxyl ($OH^-$) and oxide ($O^=$) impurities resulting from moisture which is present in air. These impurities absorb strongly in the mid IR portion of the spectrum, thus making the glass unsuitable for IR optic applications.

More recently, electron microprobe analysis of the secondary phase indicates that the black-opaque substance contains only one-half the fluorine content of the transparent phase and therefore is believed to be $ZrF_2$ or $ZrF_3$ resulting from the disassociation of $ZrF_4$ (Robinson et al. (1980) Material Research Bulletin 15, 735). These black opaque impurities are referred to herein collectively as disassociation impurities.

A process utilizing carbon tetrachloride and hydrogen fluoride reactive atmospheric (RAP) processing to prevent formation of disassociation impurities in fluorozirconate glass melts is disclosed in U.S. Pat. No. 4,341,873. This patent is assigned to the same assignee as the present invention and the contents of this patent is incorporated by reference.

The above mentioned RAP method is not only useful in preventing disassociation impurities from forming, but is also effective in removing $OH^-$ and $O^=$ impurities. The method basically involves a final treating step in which the $ZrE_4$-$BaF_2$-X melt is treated with a reactive atmosphere or rectification mixture of $He/CCl_4$ to rectify any color formation resulting from $ZrF_4$ disassociation. Although this procedure has been used successfully to produce fluorozirconate glasses with enhanced optical transmission, mechanical strength and hardness; the procedure does have a few drawbacks. For example, the use of $CCl_4$ will result in the introduction of $Cl^-$ impurities into the melt by the replacement of trace quantities of $OH^-$ with $Cl^-$ so that the anion stoichiometry is unknown. In other words, the glass fluoride stoichiometry would then be incomplete. The added $Cl^-$ also produces a higher crystallization tendency and, in extreme cases, may lead to reduced resistance to attack from environmental moisture.

It would be desirable to provide a method for treating melts of $ZrF_4$-$BaF_2$-X to prevent or reverse the formation of disassociation impurities while, at the same time, providing known and complete fluorine stoichiometry of the final melt material. By providing complete fluorine stoichiometry, the above referenced problems due to the presence of trace amounts of $Cl^-$ in the melt are eliminated.

SUMMARY OF THE INVENTION

In accordance with the present invention, a method is provided for treating fluorozirconate glass melts prepared from high purity starting materials to prevent the formation of disassociation impurities without introducing anion impurities, such as $Cl^-$, into the melt to thereby provide a melt having complete fluorine stoichiometry. The present invention also provides a method for treating fluorozirconate glasses which already contain disassociation impurities to reverse, remove or otherwise rectify the prior formation of the disassociation impurities. Rectification of the disassociation impurities is also accomplished without introducing $Cl^-$ or other anion impurities into the melt.

The present invention is based on a process for treating molten mixtures of fluorozirconate glasses with an oxygen reactive atmosphere consisting essentially of moisture free oxygen and an inert gas with the oxygen being present in the reactive atmosphere in an amount sufficient to prevent formation of the disassociation impurities in the melt and/or to remove any of the disassociation impurities already present in the melt.

During this step, only trace amounts of oxygen anion impurities should be introduced into the glass since from thermodynamics, oxygen will not displace F⁻ at the processing temperatures involved.

As an important feature of the present invention, the fluorozirconate glass melt is also contacted with a sufficient amount of a fluorine species reactive gas; for purposes of this application, a fluorine species reactive gas is one in which the essential constituent contains a reactive fluoride ion capable of replacing oxygen anion impurities in molten glass. The fluorine species reactive gas is contacted with the melt simul-taneously with or after treatment of the melt in the oxygen reactive atmosphere. The fluorine species reactive gas is contacted with the melt for a sufficient time to replace with fluoride any trace oxygen anion impurities incorporated into the melt during oxygen reactive atmosphere treatment. The resulting melt is essentially free of disassociation impurities and also essentially free of anion impurities.

As a final step in the method of the present invention, the melt is cooled in the presence of the fluorine species reactive gas to form high purity infrared-transparent fluorozirconate glass which is essentially free of disassociation and anion impurities.

The above discussed and many other features and attendant advantages of the present invention will become apparent as the invention becomes better understood by reference to the following detailed description.

DESCRIPTION OF THE PREFERRED EMBODIMENTS

The present invention may be used in general to treat a wide variety of fluorozirconate glasses in which disassociation impurities are known to form during melt formation under inert reactive atmospheres or reactive atmospheres including hydrogen fluoride (HF) diluted with an inert gas such as nitrogen, helium, or argon. For the purposes of this detailed description, the term "fluorozirconate glass" means any heavy-metal fluoride glass in which $ZrF_4$ or $HfF_4$ is a major ingredient. Such glasses include mixtures including one or more of the following compounds in addition to $ZrF_4$ or $HfF_4$: $ThF_4$, $BaF_2$, $LaF_3$, $AlF_3$, $NaF$ and/or $LiF$. The treatment of $ZrF_4$ - $BaF_2$ - X glass melts, where X is $ThF_4$, or rare earth trifluoride as previously described, is preferred with it being understood that the method may be applied to other fluorozirconate glasses in which disassociation impurities (i.e., $ZrF_3$ or $ZrF_2$) are formed during melt processing.

The method of the present invention has two basic applications. The first application involves treating molten reactant mixtures during the preparation of fluorozirconate glass from powdered or granular reactive mixture ingredients to preclude the formation of disassociation impurities. The second application involves treating previously formed glass which exhibits disassociation impurities by remelting the contaminated glass and treating it to remove any dissociation impurities present in the glass. The method used in these two applications is the same except for the fact that the starting material in the first application is the various glass forming ingredients which are mixed together and heated to form the desired glass melt, whereas, in the second application, the melt is formed by remelting previously prepared fluorozirconate glass which is already contaminated with disassociation impurities.

The basic method for producing fluorozirconate glasses are well known. Typically, the various reactants are mixed in preselected molar proportions to form powder or granular compositions or reactant mixtures which fall within the vitreous domain. For example, for $ThF_4$ - $ZrF_4$ - $BaF_2$, this domain can be described as an area of a triangle on the ternary diagram bounded by the following maxima: 63 mole percent $ZrF_4$, 15 mole percent $ThF_4$ and 38 mole percent $BaF_2$. Preferably, the molar ratios for these three main components will range from 55 mole percent to 62 mole percent $ZrF_4$, 5 mole percent to 10 mole percent $ThF_4$, and 30 mole percent to 40 mole percent $BaF_2$. One preferred composition is 0.58 moles $ZrF_4$; 0.33 moles $BaF_2$; and 0.09 moles $ThF_4$.

Other ingredients which are typically added to the reactant mixture prior to formation of the melt include NaF or LiF, $AlF_3$ or $GdF_3$.

The reactant mixture is placed in a gold, iridium or platinum crucible. Preferably the surface area of the reactant mixture is as low as possible to reduce hydrolysis from trace quantities of water. Accordingly, granular or pelletized reactant mixtures are preferred over powdered reactant mxitures. The crucible which has been filled with reactant mixture is placed inside of a silica envelope or other inert container which is evacuated by vacuum pump. Inert gas is allowed to bleed into a pressure of about one atmosphere. Then the flow of the gas is regulated to provide a flow rate through the envelope of up to about 200 cm³/min. The reactant mixture is then heated to a temperature of about 800° to 900° C. to permit reaction and formation of the fluorozirconate glass melt. At melting temperatures, the fluorozirconate glasses are particularly susceptible to attack by moisture. As previously mentioned, the usual practice was to maintain the melt in an inert atmosphere such as argon, helium or nitrogen during melt-down formation and glass formation. In accordance with the present invention, the heating and melt-down formation of the reactive mixture is carried out under an atmosphere which contains moisture-free oxygen which may be used alone or in addition to an inert gas. This atmosphere is referred to hereinafter as the "oxygen reactive" atmosphere. The oxygen used to form the oxygen reactive atmosphere must be moisture free. It is preferred that the oxygen be of the highest purity available and that the moisture content of the oxygen be below about 1.0 part per million. The amount of oxygen present in the oxygen reactive atmosphere should be well in excess of the amount necessary to prevent any formation of disassociation impurities and is preferably as high as possible. The formation of disassociation impurities is easily determined due to their opaque-black optical properties.

Preferably, the amount of moisture-free oxygen present in the oxygen reactive atmosphere relative to the inert gas will be above about 50 volume percent and preferably above 90 volume percent. The preferred oxygen has a purity of above 99.99 volume percent.

Preferably, the oxygen reactive atmosphere is formed by continually flowing the combined moisturefree oxygen and inert gas, if any, through the silica envelope or other container in which the crucible is housed. The flow rate of moisture-free oxygen through the silica envelope is adjusted to insure that disassociation impurities do not form during melting of the reactive mixture. Preferably, the flow of oxygen into the melt container or envelope is maintained during the entire heating and melting of the reactive mixture and for at least thirty minutes after the melt is formed.

In the case where disassociation impurities are already present in the fluorozirconate glass, the flow of oxygen may be continued up to 1.0 hour after the melt is formed to insure that all of the disassociation impurities have been converted to an oxidized phase.

The formation of the disassociation impurities is believed to occur according to the following reaction:

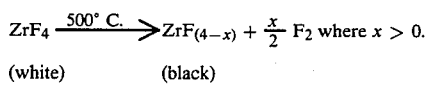

$$ZrF_4 \xrightarrow{500° C.} ZrF_{(4-x)} + \frac{x}{2} F_2 \text{ where } x > 0.$$
(white) (black)

Residual gas analysis of $ZrF_4$ at $T = 500°$ C. shows the presence of fluorine.

The oxidation of the disassociation impurity to the oxidized phase is believed to occur according to the following reaction:

$$ZrF_{(4-x)} + \frac{x}{4} O_2 \longrightarrow ZrF_{(4-x)}O_{\frac{x}{2}} \text{ where } x > 0$$

The oxygen anion impurities $ZrF_{(4-x)}O_{x/2}$ which are only introduced during the oxygen treatment of a contaminated melt are removed in accordance with the present invention by treating the melt with a fluorine species reactive gas. Th fluorine reactive gas may be introduced into the silica envelope at the same time as the oxygen reactive atmosphere to provide continual and immediate conversion of the oxygen anion impurities to $ZrF_4$. Alternatively, the fluorine reactive gas can be introduced in a second step after the flow of the oxygen reactive atmosphere to the melt container is stopped.

In addition to the fluorine species reactive gas, the gas atmosphere may include an inert gas such as argon, helium and/or nitrogen. The fluorine species reactive gas must be capable of reacting with the oxygen anion impurities which include $OH^-$, $O^{-2}$ and $OF^{-3}$. The preferred fluorine species reactive gases include $CF_4$, $BF_3$, and $SF_6$. Each of these gases includes fluorine species which react with the low level concentrations of outgas water vapor present in the glass forming apparatus during heat up of the melt. The fluorine species react with oxy anion impurities at relatively low temperatures and also react with water which is the source of the oxy anion impurities.

The amount of fluorine species reactive gas present in the gas atmosphere may be varied so long as it is sufficient to replace substantially all of the oxygen anion impurities present in the melt with fluoride. This provides a melt having complete fluorine stoichiometry, i.e., all of the components are present as fluorides. The essentially complete substitution of fluoride for the oxygen anion impurity is an important aspect of the present invention which provides a pure fluoride network upon glass formation.

A preferred fluorine species reactive gas is $CF_4$. Preferably, a large excess of this gas will be present in the fluorine species reactive gas. Preferably, the amount of $CF_4$ in the fluorine containing gas relative to inert gas will be above about 50 volume percent and more preferably above 99 volume percent. Gas with a purity of 99.9 volume percent or higher $CF_4$ is particularly preferred.

The flow rate of the fluorine species reactive gas into the reaction container such as a silica envelope will of course be varied depending upon the amount of molten reaction mixture. It is important that an excess of fluorine reactive atmosphere be provided to the molten mixture to insure essentially complete preclusion of the formation of oxygen anion impurities, such as $OH^-$ which results from hydrolysis of fluoride components. Typically, the flow of fluorine reactive gas to the reaction envelope will be continued for about 0.5 hour to 1.0 hour after the flow of the oxygen reactive gas has been stopped to insure complete anion removal.

The treatment of previously formed fluorozirconate glasses having the opaque-black disassociation impurities is basically the same as the treatment of newly prepared melt mixtures. The only differences being that the melt is formed by remelting previously formed glass instead of virgin materials and the amount of oxygen in the oxygen reactive atmosphere and the exposure time of the melt to the oxygen reactive atmosphere will necessarily be varied depending upon the degree of contamination of the glass sample being treated. In addition, the treatment of the melt with the fluorine species reactive gas will also vary according to the amount of disassociation impurities already present in the glass which are converted to oxygen anion impurities during treatment of the melt with the oxygen reactive atmosphere.

After the glass melt has been treated with the oxygen and fluorine species reactive atmospheres, the melt can be cast, annealed or cooled in situ in accordance with conventional and well-known procedures. Preferably either the casting, annealing or cooling and annealing are carried out in the fluorine reactive species atmosphere to prevent introduction of contaminants into the melt. In order to fully illustrate the invention, examples of practice are set forth below.

EXAMPLE 1

15.16 g of a reactant mixture having the following composition was prepared: 10.1 g $ZrF_4$, 3.3 g $BaF_2$, 0.99 g $LaF_3$, 0.25 g $AlF_3$ and 0.52 g $LiF$.

The mixture was placed in a platinum crucible and the crucible was placed into a standard silica ($SiO_2$) envelope having standard Teflon Swagelok gas introduction fittings and an internal volume of about 400 cm$^3$. 99.96% purity oxygen (AIRCO Corp) was used to purge the envelope. A flow rate of about 100 cc/min was maintained during heating of the mixture to a temperature of 850° C. At the same time a flow of 99.7% purity $CF_4$ (Matheson Corp) was introduced into the envelope. The oxygen flow was stopped approximately 30 min. after the mixture melted. The $CF_4$ flow was continued about ½ hour after the oxygen flow was stopped.

The melt was then cooled to form a clear transparent glass which is free of any black disassociation impurities and which also has complete fluoride stoichiometry and annealed at 250° C. for 3 hours, then cooled slowly to room temperature under the $CF_4$ atmosphere.

EXAMPLE 2

15.6 g of ZBLAN glass (AlB51254) received from Naval Research Labs (NRL) which was black in color was placed in a platinum crucible and remelted in the same envelope using the same gases as in Ex. 1. The approximate composition of the ZBLAN glass is 53 mole % $ZrF_4$, 5 mole % $LaF_3$ 19 mole % $BaF_2$, 3 mole % $AlF_3$ and 20 mole % $NaF$.

The remelted glass was maintained at a temperature of between 800°–850° C. for approximately ½ hr. with only $O_2$ flowing into the envelope. During this time, all of the black-opaque impurities disappeared. A $CF_4$ flow was started and then the $O_2$ flow was stopped. The $CF_4$ flow was maintained for ½ hr. The melt was then quenched and a transparent ingot resulted which was annealed at 255° C.

EXAMPLE 3

A second sample of ZBLA-1105 glass which was black in color was treated in the manner as Ex. 2. The resulting ingot was also clear and transparent. The approximate composition of the ZBLA-1105 glass is 58 mole % $ZrF_4$, 5 mole % $LaF_3$ and 37 mole % $BaF_2$.

EXAMPLE 4

16 g of a mixture of $ZrF_4$, $BaF_2$ and $ThF_4$ is prepared according to the following proportions: 0.58 mole of $ZrF_4$, 0.33 mole of $BaF_2$ and 0.09 mole of $ThF_4$. The starting materials are ultra pure with each being at least 99.9 weight percent pure. The mixture is treated according to Example 1 to give the desired clear transparent glass which is free of disassociation impurities and anion impurities.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A process for treating a molten mixture of fluorozirconate glass to form high purity infrared transparent glass which is essentially free of zirconium fluoride disassociation impurities and anion impurities, said process comprising the steps of:
   forming a melt of fluorozirconate glass in the presence of an oxygen reactive atmosphere consisting essentially of moisture-free oxygen, said oxygen being present in a sufficient amount to prevent formation of opaque-black disassociation impurities in said melt or remove any of said impurities already present in said melt and wherein oxygen anion impurities are introduced into said glass;
   contacting said melt with a sufficient amount of a fluorine species reactive gas for a sufficient time to replace substantially all of said oxygen anion impurities with fluoride to provide a melt which is essentially free of disassociation and anion impurities; said fluorine species reactive gas being selected from the group consisting of $CF_4$, $BF_3$ and $SF_6$ cooling said melt in the presence of said fluorine species reactive gas to form said high purity infrared transparent glass which is essentially free of disassociation and anion impurities.

2. A process according to claim 1 wherein said fluorine species reactive gas is $CF^4$, $BF_3$, or $SF_6$.

3. A process according to claim 1 wherein said fluorine species reactive gas is $CF_4$.

4. A process according to claim 1 wherein said moisture-free oxygen and said fluorine species reactive gas are combined with argon or helium.

5. A process according to claim 1 wherein said fluorozirconate glass comprises $ZrF_4$, $BaF_2$ and X where X is $ThF_4$ or a rare earth tri-fluoride.

6. A process according to claim 5 wherein said melt consists essentially of $ZrF_4$, $BaF_2$ and $ThF_4$.

7. A process according to claim 1 wherein the oxygen reactive gas and the fluorine species reactive gas are contacted simultaneously with said melt.

8. A process according to claim 1 wherein said oxygen reactive atmosphere is subsequently replaced by said fluorine species reactive atmosphere.

9. A process according to claim 1 wherein said oxygen reactive atmosphere contains more than 90 volume percent oxygen.

10. A process according to claim 1 wherein said fluorine species reactive atmosphere contains more than 90 volume percent of said fluorine species reactive gas.

11. A process according to claim 1 wherein said melt consists essentially of $ZrF_4$, $BaF_4$, $LiF$ and $AlF_3$.

12. A process for treating a molten mixture of fluorozirconate glass to form a glass which is essentially free of zirconium disassociation impurities, said process comprising the step of:
   forming a melt of fluorozirconate glass in the presence of an oxygen reactive atmosphere consisting essentially of moisture-free oxygen, said oxygen being present in a sufficient amount to prevent formation of opaque-black disassociation impurities in said melt or remove any of said impurities already present in said melt and wherein oxygen anion impurities are introduced into said glass.

13. A process for treating a molten mixture of fluorozirconate glass to form a glass which is essentially free of anion impurities, said process comprising the steps of:
   contacting a melt of fluorozirconate glass with a sufficient amount of a fluorine species reactive gas for a sufficient time to replace substantially all of said oxygen anion impurities with fluoride to provide a melt which is essentially free of disassociation and anion impurities; and
   cooling said melt in the presence of said fluorine species reactive gas.

* * * * *